United States Patent [19]
Ambalavanar et al.

[11] Patent Number: 5,602,579
[45] Date of Patent: Feb. 11, 1997

[54] SYSTEM FOR CONVERTING GRAYSCALE RESOLUTION IN A PRINTING APPARATUS

[75] Inventors: Samuel D. Ambalavanar, Rochester; Anthony Frumusa, Penfield; Kenneth D. Romano, Webster, all of N.Y.

[73] Assignee: Xerox Corporation, Stamford, Conn.

[21] Appl. No.: 301,105

[22] Filed: Sep. 6, 1994

[51] Int. Cl.$^6$ .................... B41J 2/47; B41J 29/38
[52] U.S. Cl. .................................. 347/240; 347/5
[58] Field of Search .................... 347/5, 240, 247

[56] References Cited

U.S. PATENT DOCUMENTS

| | | |
|---|---|---|
| 4,596,995 | 6/1986 | Yamakawa et al. . |
| 4,737,860 | 4/1988 | Ono et al. .................... 347/183 |
| 4,835,551 | 5/1989 | Ng . |
| 4,841,375 | 6/1989 | Nakajima et al. . |
| 4,926,200 | 5/1990 | Ohyama et al. . |
| 5,025,322 | 6/1991 | Ng .................................. 358/298 |
| 5,105,202 | 4/1992 | Lewes . |
| 5,111,218 | 5/1992 | Lebeau et al. . |
| 5,134,495 | 7/1992 | Frazier et al. .................... 358/298 |
| 5,168,283 | 12/1992 | Hammond et al. . |
| 5,185,674 | 2/1993 | Tai . |
| 5,241,329 | 8/1993 | Guerin . |
| 5,387,985 | 2/1995 | Loce et al. .................... 358/447 |

*Primary Examiner*—Benjamin R. Fuller
*Assistant Examiner*—Thinh Nguyen
*Attorney, Agent, or Firm*—R. Hutter

[57] ABSTRACT

A low-cost, high-speed system for converting high-grayscale-resolution image data to a grayscale resolution optimized for a particular output device, such as an LED bar or ink-jet printhead. A static random-access memory accepts at its address port a full image datum. The most significant digits of the datum relate to a look-up table selected for optimum performance in a given situation. The least significant digits of the datum represent the actual image datum. When the full image datum is applied to the address port, the address location identical to the full image datum outputs an output value which has been pre-loaded into the memory.

11 Claims, 2 Drawing Sheets

SYSTEM FOR CONVERTING GRAYSCALE RESOLUTION IN A PRINTING APPARATUS

The present invention relates to a high-speed, inexpensive system for adapting a stream of digital image data for optimal performance in a particular type of printing apparatus.

In the current market for short-run printing equipment, particularly at the lower end of the market where printers are connected to personal computers, there are available any number of technologies for rendering digital image data as images on paper. Dot-matrix, ink-jet, and thermal printers typically create physical images directly on the sheet on which the image is printed, such as by emitting ink or melting plastic onto the sheet. Of electrophotographic printers there are two well-known types of apparatus for rendering the desired image, the laser raster output scanner (ROS) and the light emitting diode (LED) bar. With either an LED bar or a ROS, light is used to selectively discharge areas on a pre-charged photoreceptor, the areas discharged by the light corresponding to the areas intended to be printed white in the final image. The process of selective discharging causes the print-white portions of charge-retentive surface not to attract toner particles in a subsequent development step.

Each of these various printing technologies has its own "best" technique for applying data thereto for optimal print quality. Some technologies, such as ink-jet and the laser ROS, are typically binary processes, wherein pixels formed by the apparatus will be either black or white. Other technologies, such as the LED bar or thermal printheads, may be capable of providing multiple levels of image density to individual pixels. For example, in one known design of an LED bar, each area on the LED bar corresponding to one pixel is capable of producing four distinct spot sizes, corresponding to four distinct image densities. These different types of printing apparatus, or "output devices," will each have associated therewith a best arrangement for applying image data thereto.

Further, different types of images which are typically printed will have different requirements for best appearance on paper. Generally speaking, applications in which only text is printed will not need provisions for rendering halftones, while such halftones are important in reproducing, for example, photographs. Various printing technologies will optimally produce particular images in different ways.

Although there exists on the market any number of different technologies for printing images, the sources of such image data, such as personal computers, may have themselves there own conventions for rendering image data, particularly in the matter of rendering halftones. It is an object of the present invention to provide a low-cost, high-speed system for converting image data form a source of data to a form optimized for use on a particular type of printing apparatus.

U.S. Pat. No. 4,596,995 discloses an LED array printer head having time control circuits for controlling the on and off times of individual LEDs. Variations in the characteristics of each LED is corrected for to allow formation of a high-resolution image or a halftone image.

U.S. Pat. No. 4,835,551 discloses an LED array and associated control system, wherein image data is divided into pictorial and non-pictorial information. The pictorial information is reproduced at one resolution, while non-pictorial information is reproduced at another resolution.

U.S. Pat. No. 4,841,375 discloses an image-resolution conversion apparatus for use with a printer having a pixel density different from the original pixel density.

U.S. Pat. No. 4,926,200 discloses an electrophotographic printer having two separate LED print arrays, different in linear density. The different printheads are used as needed according to the particular image to be printed.

U.S. Pat. No. 5,025,322 discloses an LED array printer wherein each pixel area is divided into multiple sub-pixel areas. The patent discusses various techniques for improving the exposure from the LEDs for optimal halftone performance.

U.S. Pat. No. 5,105,202 discloses an LED array printer wherein the charge-retentive surface is movable at variable speeds. The process speed of the charge-retentive surface can be slowed down so the LEDs can create a high-resolution image.

U.S. Pat. No. 5,111,218 discloses a system for electronically controlling an LED-array printer, having means for optimizing the number of lines of information printed during each scan to reduce splitting of characters between scans when text is printed.

U.S. Pat. No. 5,134,495 discloses a system for adapting a laser printer to various desired resolutions for different purposes. The energy source for the printer has a nominal resolution and a predetermined threshold level for producing output image dots. This threshold level can be modified to different resolutions or modified to produce output dots along an axis different from the axis of the display device, by selectively activating the energy source to produce overlap areas that exceed the device threshold and thereby produce dots at positions that are not on the normal resolution positions of the device.

U.S. Pat. No. 5,168,283 discloses an LED array printer having a high-resolution image print bar and a low-resolution image print bar.

U.S. Pat. No. 5,185,674 discloses a system for compressing data so that original data scanned from a hardcopy in one resolution may be printed or displayed in a second resolution. The system utilizes a number of buffers and shift registers for accomplishing this conversion.

U.S. Pat. No. 5,241,329 discloses a ROS which can be instantly varied between various resolutions. Instead of a single beam being reflected from a rotating polygon, a plurality of simultaneous beams are provided, the number of beams per unit of length being a common denominator of all of the selectable spot densities. By activating different numbers of these simultaneous beams, different resolutions can be created.

According to one aspect of the present invention, there is provided a system for converting grayscale resolution of data having an original grayscale resolution associated therewith to be applied to an output device in a printing apparatus. There is provided a memory, including a plurality of addresses, each address being numbered with a unique binary number and containing a selectable output value. A selector associated with the memory appends a first subset of binary digits to each image datum to obtain a full image datum, the binary number of the full image datum being identical to a unique address in the memory.

According to another aspect of the present invention, there is provided a memory device for use in a system for converting data to be applied to an output device in a printing apparatus. A random-access memory includes an address port, a output port, and a plurality of addresses, each address being numbered with a unique binary number and containing a selectable output value. The addresses include a plurality of tables of contiguous addresses, including a first table corresponding to the operation of an output device with a first output scale, and a second table corresponding to the operation of an output device with a second output scale. Means are provided for outputting on the output port the output value in an address entered on the address port.

Figure 1:
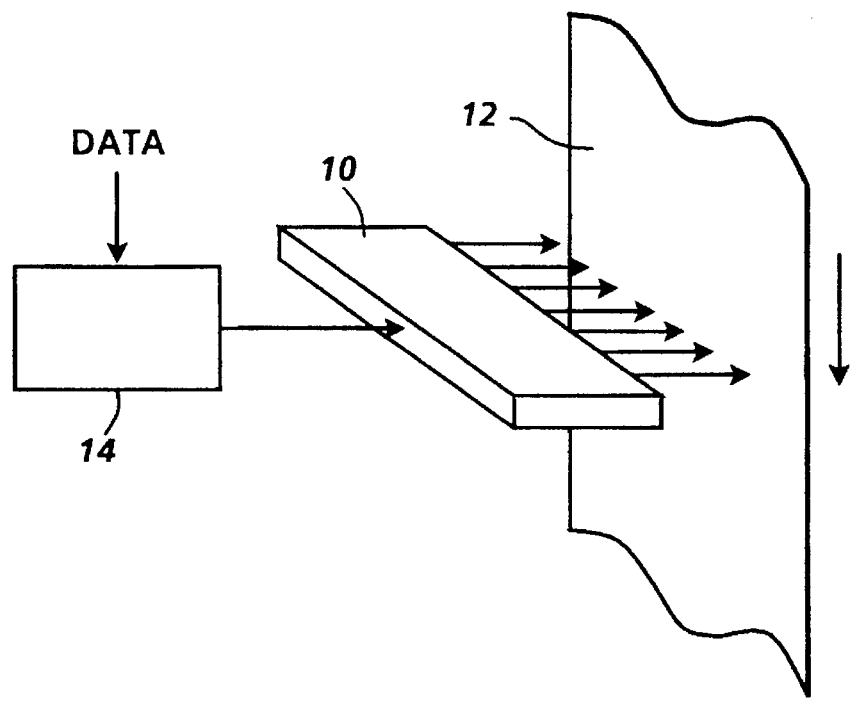
FIG. 1 is a simplified perspective view of the essential elements of a digital printing apparatus.

FIG. 1 is a simplified perspective view of the essential elements of a digital printing apparatus, illustrating the overall function of the system of the present invention. In FIG. 1 is shown an "output device" 10, which correates an image on a surface 12 moving past it. For purposes of the present invention, this output device 10 can be any type of device for creating a physical image or a latent image on a surface 12. For example, if the surface 12 is the sheet on which the final image is to be printed, output device 10 could be, for example, an ink-jet printhead, which will selectively cause ink droplets to be emitted onto the surface 12 in response to digital data activating the ink ejectors therein. Alternately, the output device 10 could be a dot-matrix printhead, wherein a set of pins are activated through a ribbon to place marks on the surface 12. Output device 10 could also be a "thermal printhead," having a set of small heating elements which, when used to heat a ribbon of translucent plastic, cause a portion of the plastic to melt onto the surface 12. These above mentioned systems are designed to create physical images, that is, images directly onto the substrate which will be viewed by an observer. In electrophotographic printers, the surface 12 is typically a charge-retentive surface, also known as a photoreceptor, and the function of the output device 10 is to selectively discharge certain areas of the charge-retentive surface 12 in areas corresponding to print-white areas of the final image.

Taking, as a particular example, an LED array as an output device 10, such an LED array or LED bar typically includes a linear array of LEDs defined on one or more semiconductor chips. As the surface 12 moves past the linear array, the LEDs are selectably activated to discharge various small areas on the surface 12 moving past the linear array. The more that a given area on the surface 12 is discharged, the less attractive that particular area will be for toner particles in the subsequent development step in the xerographic process, wherein toner particles are brought in proximity to the surface 12 to be attracted to the charged areas thereon. There also exist in the prior art systems in which the LEDs are used to create the charge on the surface 12, as opposed to discharging areas of a pre-charged surface.

In one typical design of an LED array, each LED in the array, corresponding to one pixel area across the length of the surface 12, is capable of emitting light in a manner that would create four distinct grayscale levels on the given pixel area. Generally, the more intense the light emitted by the LED, the more discharge will take place in the pixel area, although the situation will be reversed if the LED array is used as a charging bar. These four levels of brightness are typically manifest either in four distinct voltage levels which can be selectively applied to a single LED; an LED defining a plurality of light sources, which can be activated either separately or together; or, a system may be provided which controls the time duration of LED activation for each pixel area as the surface moves past the array. By varying the time duration of LED activation as the surface 12 moves at a constant velocity past an individual LED, different amounts of surface area can be effectively discharged by the LED within a single pixel area. No matter which particular type of intermediate exposure system is used, however, with present LED technology an LED array is typically capable of no more than four distinct output levels per pixel area. When a halftone image, such as a photograph, is to be reproduced, the fact that four effective halftone levels per pixel area are available, must be taken into account for optimal print quality given the hardware.

Sources of digital data for use in creating images, which may include any type of computer or hard-copy scanner, will have one system or another for organizing data, particularly by grayscale resolution, when converting the original image into a digital data stream. One typical system, useful for rendering monochrome photographs, involves assigning to each pixel in the original image a grayscale value, for example from 0 to 255, depending on the darkness along the grayscale of that particular pixel. As mentioned above, most types of inexpensive printing apparatus are incapable of reproducing images at this resolution; the LED array, for example, is capable of only four levels of grayscale per pixel. Nonetheless, such inexpensive apparatus may be able to provide sufficiently satisfactory results for many users. The question then becomes how to convert "raw data" having a 256 level grayscale for use in a printing apparatus having only 2 to 4 levels of grayscale. A system is required to perform this conversion in a manner which will provide the most satisfactory results. Such as system is generally shown in FIG. 1 as data converter 14, which is interposed between an incoming stream of digital image data and the output device 10.

Figure 2:
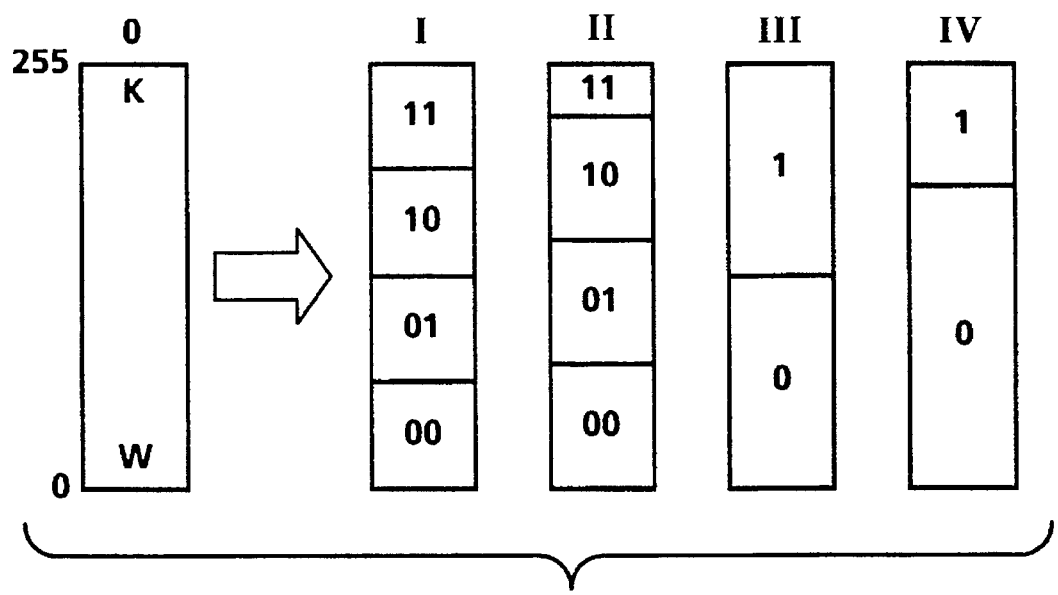
FIG. 2 is a set of diagrams illustrating the principle of grayscale conversion as performed by the system of the present invention.

FIG. 2 shows four example arrangements wherein original data rendered in a 256-level grayscale resolution is converted for use in an output device having a much lower (two or four level) grayscale resolution. In the left bar in FIG. 2 is shown a scale of the original data wherein a grayscale level of 0 corresponds to a white portion of the image, a 255 level corresponds to a completely black portion of the image, and wherein the intermediate level corresponds to progressively darker gray areas. The bars marked I–IV show possible options for converting this original high-grayscale-resolution data to low-grayscale-resolution data. In scale I the output resolution is an equal division of the entire grayscale into 4 equal extents, which are here labeled by 2-bit binary numbers 00 to 11. This 2-bit rendering may correspond, for example, to activating (or not activating) 0, 1, or both LEDs when two LEDs are available to charge or discharge a particular area of the surface 12, or also could relate to variations in intensity or time duration of an LED exposure to a pixel area on surface 12.

In terms of ultimate print quality, the most salient feature of any output scale such as I–IV is the locations of the "thresholds" where one iteration of the 256-level grayscale causes a jump in the low-resolution grayscale. In scale I, for example, these thresholds are spaced evenly along the grayscale, so that "jumps" occur at 63, 127, and 191 on the original 0—to—255 scale. It may be found, however, that a simple even division of the grayscale, as shown in scale I, results in unrealistic or unsatisfactory renderings of photographs. It may be desired to "fine-tune" the thresholds for different grayscale levels, for the particular printing apparatus, to yield better print quality. Scale II in FIG. 2 shows a slightly different division of the grayscale, in which, for example, only the very darkest regions, in excess of 220 on the 0—to—255 scale, are printed with the 11 "dark" exposure. Such a fine-tuned division of the grayscale may yield more realistic renderings of photographs, and the optimal division of the grayscale (i.e., the locations of the thresholds) will depend on the printing hardware and the image to be printed.

Bars III and IV of FIG. 2 show how the original grayscale O can be divided for a two-level, or binary, system. Such a two-level system may be apparent, for example, an ink-jet apparatus, in which a particular ejector can eject ink onto a particular pixel location on a sheet only on an all-or-nothing basis. If the output is 0, then no ink will be ejected on that particular pixel location; if the output data is 1, then the ejector will eject a droplet of ink on that location. In bar III there is shown an essentially even division of the grayscale so that any input data of 127 or better will cause the ejector for that pixel location to eject a droplet of ink on the print. Of course, this may turn out to be a too-low threshold, rendering an image of a photograph, for example, too dark and unrealistic. It may be desired to substantially raise the threshold before a droplet of ink is emitted, such as in bar IV, where the threshold of ejection is about 180. In such a case, only the relatively darker areas of the original image will cause the ejector to emit an ink droplet on the sheet.

Different output scales such as I–IV will be necessary when sending data to different types of printing apparatus. Different printing apparatus will be able to divide the grayscale into more or fewer divisions, and different particular apparatus may require different "thresholds" between grayscale levels for activation. Further, different types of images (such as the difference between text and photographs) may be preferably printed with different output sets. The present invention relates to a high-speed, low-cost system for providing a particular printing apparatus with the best grayscale resolution output scale.

Figure 3:
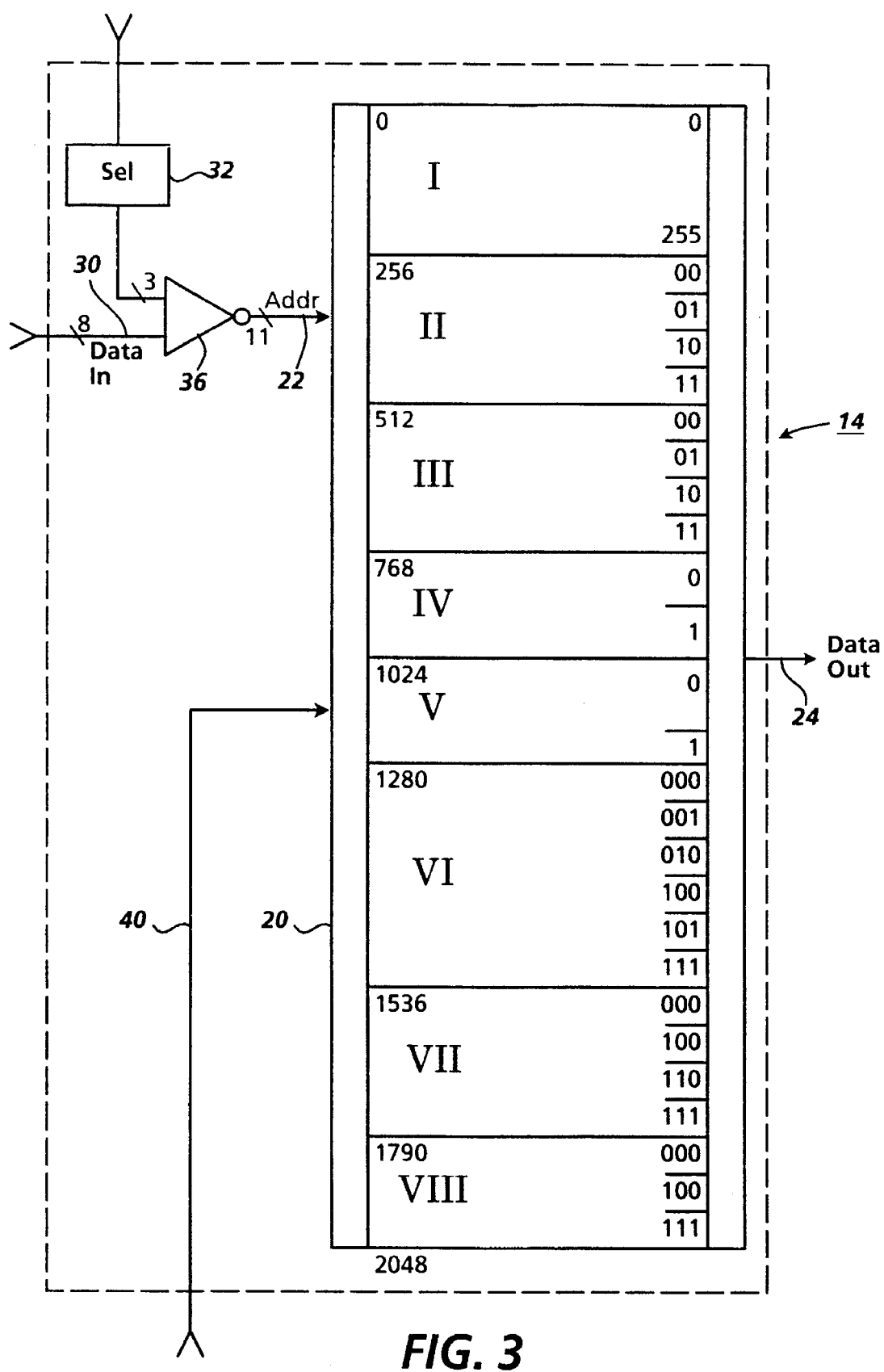
FIG. 3 is a systems diagram of one embodiment of the present invention.

FIG. 3 is a systems diagram showing the basic elements of the data converter 14 incorporating the system of the present invention. As can be seen, the main portion of the converter 14 is a memory 20, which is preferably in the form of a static random-access memory (SRAM). The memory 20 comprises, in this case, 2K (2048) address locations. A memory 20 in the form of a 2K SRAM is a relatively simple and inexpensive device, having at least an address port 22 and a data-out port 24. The data transfer associated with address port 22 and data-out port 24 may be serial or parallel as desired for a particular design. Each of these address locations has a unique address, which can be stated by a unique binary number. When the SRAM is set up for use in the present invention, whenever a digital number is entered into the address port, the memory 20 outputs a fixed binary number, which has been pre-loaded in the memory location having the cited address, to the data-out port 24. In short, the memory 20 acts as a look-up table, but, as will be seen below, the gray scale data is used directly as an address applied to the SRAM, and the SRAM responds by outputting the datum that has been preloaded at that particular address.

As can be seen, the 2048 memory locations in the memory 20 are here organized in eight discrete sets, numbered I to VIII. In the upper left corner of each table can be seen the boundaries of addresses between tables, from 0 at the top of the memory as shown in the Figure, down to 2048. On the right-hand side of each table in memory 20 is shown ranges of outputs which may be output from data-out port 24 when a particular address on the left side of each table is entered on the address port 22. Each table I–VIII is divided into a unique output scale, as in FIG. 2. An address entered on address port 22 will correspond to one of the addresses along the left-hand side of each table.

According to the present invention, the input at address port 22 of memory 20 is an 11-bit binary number. Of these 11 digits for every address, the eight least significant digits are 0—to—255 grayscale resolution raw data coming from a source such as a data-in port 30. The three most significant digits going into address port 22 come from a user-operated selector 32. When the eight digits from the data port 30 are appended the three digits from the selector 32, such as at combiner 36, a single 11-bit binary number results. It is this binary number, combining both the selection number and the actual data, which is applied to the address port 22.

Most commercially-available SRAMs include both address ports and data ports for loading data into the SRAM. Significantly, according to the present invention, the original image data from data port 30 is applied not to the data port of the SRAM but rather to the address port of the SRAM forming memory 20. Image data is thus used as address data for the SRAM; while the system is in operation no data actually enters the memory locations in the SRAM.

Looking at the arrangement of boundaries between tables I–VIII in the memory 20, it will be apparent that each table takes up 256 addresses. These 256 addresses per table correspond to the 256 possible gray scale levels on the raw data coming into data-in port 30. Each table I–VIII can thus be distinguished by the three most significant digits applied to the address port 22. For example, to access table I, the top three digits applied to the address port will always be 000; to access the first address in table II, the first three digits of the address will be 001, to make a complete binary number of 00100000000, which is binary for 256. In an 11-bit binary number, the three most significant digits select a table I–VIII, while the less significant digits access an individual address within the selected table. Within each table in memory 20 shown in FIG. 3, each address corresponds to an increase in darkness along the gray scale from 0 to 255 within each table. Thus, returning to FIG. 2, while the raw data corresponds to the left-hand bar marked O, any particular selected table in memory 20 will correspond to one kind of output scale. The sequence of addresses from 0 to 2048 in the memory 20 thus represent eight selectable gray scale resolution output scales in effect laid "end-to-end."

To take one concrete example of the table selection system of the present invention, if the input data on data port 30 is 00101010=42, and the table selector 32 outputs the default 000 output, the total 11-bit binary number is 00000101010=42; however, if the selector 32 outputs 001, the total binary number applied to address port 22 will be 00100101010=256+42=298, placing the address as the 42nd address in table II: the table is changed, but the original data stays the same. When this number is entered on address port 22, the output datum which has been pre-loaded at the 42nd address in table II (here, 00) is output on data-out port 24. Further, various printing apparatus may operate under different systems wherein numerically higher output values create either lighter or darker areas on the finished sheet—i.e., in a given apparatus, 00 may mean solid white and 11 solid black, while the opposite may be true in another apparatus. It will be apparent that the output sets could take this fact into account for a given apparatus, and in effect "invert" image data as necessary.

In the example tables shown in FIG. 3, it can be seen that table I is a table which simply passes through the raw 0—to—255 data on the data output line, as might be required if, for example, the output data was not going to a printer but to another image-processing device. Tables II and III represent two-bit output systems, such as for an LED array, although it can be seen that the two tables have different thresholds for different outputs to the LEDs. Similarly, tables IV and V output binary outputs, although it may be seen that the table V has a higher threshold of darkness of the incoming data for activating an ink-jet ejector. Tables VI, VII, and VIII likewise show possible tables for a three-bit system, which may be used, for example, in a thermal printhead.

If the converter 14 is required only for a single output device, another practical use for multiple tables would be for the creation of polychrome images, wherein each use of the output device, such as an LED array with a multipass photoreceptor, corresponds to a different primary color image. For example, if the LED array in one pass of the photoreceptor discharges the surface for the black portion of the image in one pass and the yellow portion of the image in another pass, different primary colors may require different thresholds between outputs for the best-quality full-color image. In such a case, different tables in memory 20 could be provided for optimized output scales for each color, and the selector 32 could be sensitive to which primary color is being printed at a given pass, thereby selecting the appropriate table. This same principle could apply to a full-color ink-jet system, wherein different colors may have different optimal thresholds for firing the ink ejector.

It is intended that selector 32 be operable by a user for selecting the best table for use when it is desired to transfer or print out a particular data set. As such, the selector 14 can be placed physically within a particular printer, or may be placed at the data source, such as at a personal computer, so that a user on a network selecting a particular printer can utilize the best possible table for the printer he has selected. For example, if the user (either explicitly or by default) selected an ink-jet printer, he would have to use tables IV or V; if the document he wishes to print on this ink-jet printer is all text, table IV may be desirable. If, however, the image to be printed is a photograph, or is based on scanned-in data which may have undesirable noise in it, the higher-threshold table, V, may be preferred. Of course, the selection of the actual table may be invisible to the user, and there may be provided systems for choosing the correct table based on the nature of the selected printer, and the nature of the data.

Although, in the basic real-time operation of the memory 20, all of the real-time data enters the SRAM through its address port 22, there can be a use for a data loading port such as indicated as 40, which operates for loading in data at the various addresses. Such a data loading port, also known as a data-in port, is typically present in an off-the-shelf SRAM. The data loading port can be used to load in data to create new output scales, such as I–VIII, as needed, even when the SRAM of memory 20 has already been installed in hardware. This "on-the-fly" loading of output scales can substantially enhance the universality of any apparatus in which the data converter 14 is installed. For example, if a personal computer is hooked up to a new and unfamiliar printing machine, the printing machine could, as part of an initialization process, load in its individually optimized output scales at prearranged locations in the SRAM at the computer. Further, a print-quality monitor associated with the output device, such as a densitometer, could detect print defects (such as too-light text, or improper color balance) and compensate for the defect by selecting or loading into the memory 20 an output scale to compensate for the hardware defect, such as an output scale having lower thresholds. The fact that real-time image data is entered at the address port, and not the data loading port, of the SRAM "frees up" the data loading port of the SRAM to facilitate this on-the-fly loading of output scales. If such "on-the-fly" table updating is ot necessary, memory 20 could be in the form of a read-only memory.

The main advantage of the present invention is that it enables versatility when using any number of printing apparatus of different types. Most importantly, the system of the present invention is both inexpensive and so fast as to be essentially invisible to any image-processing system. No calculations of any sort are performed, nor are any time-consuming activities involving, for example, shift registers ever employed. All of the potential outputs for a variety of devices are pre-loaded into the SRAM forming memory 20, and so very short response times, on the order of 15 nanoseconds, are possible.

We claim:

1. A system for converting grayscale resolution of image data having an original grayscale resolution associated therewith to be applied to an output device in a printing apparatus, comprising:

a memory, including a plurality of addresses, each address being numbered with a unique binary number and containing a selectable output value; and a selector operatively associated with the memory, the selector appending a first subset of binary digits to each image datum in the image data to obtain a full image datum from each image datum, each full image datum obtained from the image data being identical to a unique binary number corresponding to one address in the memory;

wherein each full image datum obtained from the data comprises a second subset of binary digits corresponding to digital values of the original grayscale resolution, the second subset of digits being less significant than the first subset.

2. The system of claim 1, further comprising means for outputting the output value at the unique address in the memory.

3. The system of claim 1, wherein the memory includes a random-access memory.

4. The system of claim 3, wherein the memory includes an address port, and wherein the selector applies the full image datum to the address port.

5. The system of claim 1, further comprising means for selecting the first subset of binary digits according to the output device type.

6. The system of claim 1, wherein the addresses in the memory comprise a plurality of tables of contiguous addresses, including a first table corresponding to an operation of an output device operable with output values on a first output scale, and a second table corresponding to the operation of an output device operable with output values on a second output scale.

7. The system of claim 1, wherein the addresses in the memory comprise a plurality of tables of contiguous addresses, including a first table suitable for operation of an output device of a first type, and a second table suitable for operation of an output device of a second type.

8. The system of claim 1, further comprising a data loading port for loading selectable output values to selected addresses in the memory.

9. A memory device for use in a system for converting data to be applied to an output device in a printing apparatus, comprising:

a random-access memory including an address port, a output port, and a plurality of addresses, each address being numbered with a unique binary number and containing a selectable output value, the addresses including a plurality of tables of contiguous addresses, including a first table corresponding to an operation of an output device operable with output values on a first output scale, and a second table corresponding to the operation of an output device operable with output values on a second output scale; and means for outputting on the output port the output value contained in an address entered on the address port.

10. The device of claim 9, wherein the first and second tables each comprise a set of addresses wherein a subset of digits of each address relate to equivalent addresses within each table.

11. The device of claim 9, further comprising a data loading port for loading selectable output values to selected addresses in the memory.

* * * * *